(12) United States Patent
Broccatelli

(10) Patent No.: US 11,920,006 B2
(45) Date of Patent: Mar. 5, 2024

(54) COMPOSITIONS COMPRISING CYCLIC ALKYLENE CARBONATES AND POLYAMIDES, PROCESSES FOR THEIR PREPARATION AND THEIR USES

(71) Applicant: REDANTEA S.R.L., Milan (IT)

(72) Inventor: Massimo Broccatelli, Bastia Umbra (IT)

(73) Assignee: REDANTEA S.R.L., Milan (IT)

( * ) Notice: Subject to any disclaimer, the term of this patent is extended or adjusted under 35 U.S.C. 154(b) by 174 days.

(21) Appl. No.: 17/434,503

(22) PCT Filed: Jul. 10, 2019

(86) PCT No.: PCT/IB2019/055874
§ 371 (c)(1),
(2) Date: Aug. 27, 2021

(87) PCT Pub. No.: WO2021/005402
PCT Pub. Date: Jan. 14, 2021

(65) Prior Publication Data
US 2022/0127423 A1  Apr. 28, 2022

(51) Int. Cl.
| | | |
|---|---|---|
| C08J 3/09 | (2006.01) |
| C08G 69/46 | (2006.01) |
| C08J 3/12 | (2006.01) |
| C08K 5/1565 | (2006.01) |
| C08K 5/3472 | (2006.01) |
| C08L 67/02 | (2006.01) |
| C08L 69/00 | (2006.01) |
| C08L 77/00 | (2006.01) |

(52) U.S. Cl.
CPC .............. *C08J 3/095* (2013.01); *C08G 69/46* (2013.01); *C08J 3/12* (2013.01); *C08K 5/1565* (2013.01); *C08K 5/3472* (2013.01); *C08L 67/02* (2013.01); *C08L 69/00* (2013.01); *C08L 77/00* (2013.01); *C08J 2377/00* (2013.01); *C08J 2467/02* (2013.01); *C08J 2469/00* (2013.01); *Y02W 30/62* (2015.05)

(58) Field of Classification Search
CPC ... C08G 69/46; C08J 3/095; C08J 3/12; C08J 2377/00; C08J 2467/02; C08J 2469/00; C08K 5/1565; C08K 5/3472; C08L 77/00; C08L 67/02; C08L 69/00; Y02W 30/62
See application file for complete search history.

(56) References Cited

U.S. PATENT DOCUMENTS

2016/0002393 A1   1/2016  Kim
2016/0325147 A1*  11/2016 Sullivan ................. C08G 69/40

FOREIGN PATENT DOCUMENTS

| EP | 0 850 982 | 7/1998 |
| WO | 2005/118691 | 12/2005 |
| WO | 2017/080651 | 5/2017 |

OTHER PUBLICATIONS

International Serch Report and written opinion issued for PCT/IB2019/055874 dated Aug. 4, 2020 by the EPO.

\* cited by examiner

*Primary Examiner* — Patrick D Niland
(74) *Attorney, Agent, or Firm* — MARIETTI GISLON E TRUPIANO S.R.L.; Silvia Salvadori

(57) ABSTRACT

A subject-matter of the present invention are new complexes comprising cyclic alkylene carbonates and polyamides, processes for their preparation and uses. Additionally, a subject-matter of the invention is the use of alkylene carbonates for recycling, solubilization, purification, and/or powdering of polyamide-based materials.

14 Claims, No Drawings

COMPOSITIONS COMPRISING CYCLIC ALKYLENE CARBONATES AND POLYAMIDES, PROCESSES FOR THEIR PREPARATION AND THEIR USES

This application is a U.S. national stage of PCT/IB2019/055874 filed on 10 Jul. 2019 the content of which is incorporated herein by reference in its entireties.

DESCRIPTION OF THE INVENTION

A subject-matter of the present invention are new complexes comprising cyclic alkylene carbonates and polyamides, processes for their preparation and uses. Additionally, a subject-matter of the invention is the use of alkylene carbonates for recycling, solubilization, purification, and/or powdering of polyamide-based materials.

TECHNICAL BACKGROUND

Carbonates, particularly alkylene carbonates, represent a family of solvents defined as "green solvents", i.e. safe and with low toxicity if any (in English "environmentally friendly solvents") since they exhibit very low vapor pressures, high boiling points, poor flammability, and high self-ignition temperatures.

Polyamides represent a class of polymers having amide-type moieties along their carbon backbone. Polyamides are used, for example, in the manufacturing of technical items, fishing nets, and fabrics, whenever high technical features and resistance to environmental factors are required.

Polyamides can be transformed in articles by usual extrusion and injection molding techniques and could also be used in processes of polymer "rotational molding", which is a technique that allows obtaining articles with a hollow body starting from powdered polymers if their powdering wasn't highly expensive. It is also noteworthy that, theoretically, items made from polyamides could be recycled many times, but unfortunately costs for their recycling that obviously envisages also steps for their separation from other materials connected thereto, are quite expensive. A typical example of these problems is represented by fishing nets worn out to the point they can no longer be used. They represent an important polluting factor for all coasts of big fishing fleets, such as, in order of importance, those of China, Peru, Russia, USA. To make the polyamide of such products free from metal hooks, little cotton or polyethylene cordage, manual action is required, but no method exists to make polyamide free from the sand stuck in the net knots and from the high number of small shellfish shells tenaciously attached to meshes thereof. Hence there exists the need to provide new processes for purification, and recycling of polyamide containing items, that are simple and economically advantageous and that do not imply the use of solvents or reagents that are toxic for humans and the environment.

Aims of the Invention

One aim of the present invention is to provide new complexes comprising cyclic alkylene carbonates and polyamides and their use for purification, powdering and recycling of polyamide-based materials.

Another aim of the invention is to provide processes for preparing said new complexes.

A further aim of the invention is to provide processes for purification and recycling of polyamide-based materials.

It is also one aim of the invention to provide processes for solubilization and powdering of polyamide-based materials.

These and other aims can be obtained through complexes and processes as defined in the present description and in the appended claims.

DESCRIPTION OF THE INVENTION

According to one of its aspects, a subject-matter of the invention is a complex comprising at least one cyclic alkylene carbonate and at least one polyamide, in particular a complex comprising at least one cyclic alkylene carbonate and at least one polyamide and that is in a solid form at room temperature and pressure.

In the description of the present invention, the term "complex" is intended to designate a composite substance, which is comprised of two or more substances and displays physical characteristics that are distinct from those of each one of the substances it originates from.

The expression "cyclic alkylene carbonate", or also "alkylene carbonate" alone, here is intended to designate a complex of formula (I)

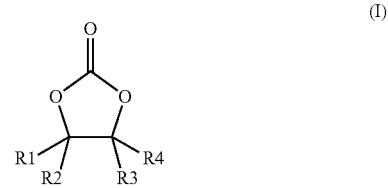

(I)

wherein R1, R2, R3 and R4, each independently, represent a hydrogen atom or a straight or branched alkyl chain, having 1 to 4 carbon atoms, preferably a hydrogen atom or an alkyl chain having 1 to 2 carbon atoms.

According to a preferred embodiment, R1, R2, R3 and R4 are hydrogen or R1 and R3 are hydrogen and R2 and R4 are an alkyl chain having 1 or 2 carbon atoms, or R1, R2 and R3 are hydrogen and R4 is an alkyl chain having 1 or 2 carbon atoms. In the present description, mixtures of different alkylene carbonates are also encompassed by the expression "alkylene carbonate".

Preferred alkylene carbonates according to the invention are ethylene carbonate (EC), propylene carbonate (PC), butylene carbonates (BC) and mixtures thereof, having the following formulas:

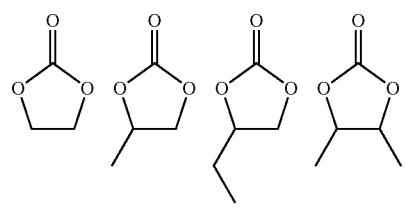

The expression "polyamide" here is intended to designate a polymer, or a mixture of polymers, having amide-type moieties along the carbon backbone. Preferred polyamides according to the invention are Nylon 6 and Nylon 6,6. However, more generally, it refers to all types of Nylons and Aramids.

According to a preferred embodiment, said alkylene carbonates are selected from ethylene carbonate (EC), propylene carbonate (PC), butylene carbonates (BC) as defined above, and mixtures thereof, and said polyamide is selected from Nylon and Aramids, more preferably Nylon 6 and Nylon 6,6.

As said, the complex of the invention is solid at room temperature and pressure. Additionally, the complex of the invention has a melting temperature higher than that of the alkylene carbonate and lower than that of the polyamide as defined above. According to a preferred embodiment, the weight ratio of polyamide/alkylene carbonate ranges from 0.2 to 1, advantageously from 0.25 to 0.8, for example from 0.25 to 0.5.

According to a preferred embodiment, the complex of the invention essentially consists of an alkylene carbonate and a polyamide, where "essentially consists" is intended to designate that the two said components represent the major components of the complex, which complex nonetheless may also comprise other components, although in a lower amount. As a not limiting example, the complex of the invention may also comprise additional components selected from impurities, other polymers, additives, nanoparticles, foaming agents, modifying agents, stabilizing agents, dyes, impurities and the like.

According to a preferred embodiment, the two components in the complex of the invention, at least one alkylene carbonate and at least one polyamide, together represent at least 50%, preferably at least 90%, even more preferably at least 95% and up to 100%, said percentage being expressed by weight relative to the total weight of the complex.

According to another of its aspects, the invention refers to a process for preparing the complex of the invention as defined above, said process comprising:

a. mixing at least one polyamide-based material as defined above, with at least one alkylene carbonate as defined above, preheated at a temperature ranging from 160° C. to the boiling point of said at least one alkylene carbonate;
b. optionally, filtering the fluid mixture from step (a), warm and, preferably, under nitrogen;
c. optionally adding one or more other components; and
d. cooling down the fluid mixture thus obtained.

Here "polyamide-based material" is intended to designate a polyamide-based material of any origin and may, for example, be a pure polyamide, a polyamide in admixture with other components and/or originate from items and products made of polyamide, as it will be better described below.

Before step (a), it is preferable to dry the polyamide material, for example in an oven.

Step (a) is preferably carried out in the absence of oxygen, preferably under an inert atmosphere, for example under nitrogen, or alternatively under vacuum, for example under a pressure of 3 mmHg, and advantageously with shaking.

Still in step (a) the at least one alkylene carbonate is preheated to the desired temperature before being mixed with the at least one polyamide, at a temperature ranging from 180° C. to the boiling point of said at least one alkylene carbonate, for example around 200° C.

In the process of the present invention, the weight ratio of polyamide/alkylene carbonate ranges from 0.2 to 1, advantageously from 0.25 to 0.7.

According to an embodiment, in step (b), filtration allows separating polyamide from possible solid residues other than polyamide, to obtain a complex of the invention essentially consisting of polyamide and alkylene carbonate. "Essentially consisting" is intended to designate that the two components, at least one alkylene carbonate and at least one polyamide, represent at least 50%, preferably at least 90%, even more preferably at least 95% and up to 100%, said percentage being expressed by weight relative to the total weight of the complex.

In step (d) the mixture is preferably allowed to cool down to room temperature.

The solid complex obtained through the process described above represents a further subject-matter of the invention.

While not wishing to be bound by any particular theory, we believe that, considering the high dipole moment of carbonates (EC 4.80; PC 4.98; BC 5.28), in the complexes subject-matter of the present invention, ionic forces are established between the polyamide macromolecules and the strongly polar carbonate molecules, so to keep the solvent in the solid state even at temperatures and pressures at which it is normally a liquid, i.e. even at room temperature and pressure.

It is understood that the fluid solutions obtained in step (a) at temperatures of 160° C. or higher, have viscosities that depend on both temperature and concentration and on the intrinsic viscosity of the polyamide used. By changing these conditions it is then possible for the skilled in the art to obtain the desired viscosity of the solution, for example to facilitate the operations of filtering and/or dispersion of additional components and/or reagents in the mixture in the fluid/liquid state.

Complexes of the present invention that, as said, are solid at room temperature and pressure, exhibit the important advantage of being brittle and, consequently, readily powdered, their brittleness being higher the higher the amount of alkylene carbonate is, as compared to that of polyamide. Powdering can be carried out by simple machine or manual grinding, advantageously before complete cooling of the complex obtained in step (d), for example at 40-60° C.; preferably around 50° C.

From the powdered complex of the invention, obtained for example after simple grinding, it is easy to recover completely or, if desired only partly, the alkylene carbonate, for example, by simple extraction with solvents in which it is soluble, as opposed to polyamide. A preferred solvent is supercritical $CO_2$, but more conventional solvents can be advantageously used, such as, for example, acetone, methylene chloride and the like. Generally, any solvent can be used in which the alkylene carbonate is soluble, but the used polyamide is not.

In this way, alkylene carbonate and polyamide are separated, obtaining a powder of essentially pure polyamide, which constitutes a further subject-matter of the invention.

The use of at least one alkylene carbonate as defined above to powder a polyamide or a polyamide mixture is a further subject-matter of the present invention.

The process to obtain powdered polyamides, by powdering and extraction of alkylene carbonate from the complex obtained in step (d) described above, and the powders thus obtained represent additional subject-matters of the invention, as well as their use in rotational molding processes.

Currently, rotational molding is used only to manufacture articles that cannot be manufactured by extrusion or injection molding or by blow molding. It is understood that making powdered polyamides available, at a cost equal or lower than that of granules, represents a new opportunity. This advantage provided by the invention represents important technical progress.

If desired, the powders obtained according to the present invention can also be granulated by extrusion according to known techniques, to be employed in other manufacturing techniques.

Since polyamide-based starting materials are not necessarily pure, but can be a part of post-consumer items and products, where the polyamide is associated with other substances, it is clear that processes deriving from the present invention are of great environmental value as well. In fact, when dissolving said polyamide-based materials, the fluid mixture obtained from step (a) of the process reported above can be filtered according to step (b), separating possible solids from the polyamide dissolved in a hot mixture; polyamide can then be recovered in its pure state, by solidification and subsequent removal of alkylene carbonate, for example, by extraction, as described above.

Hence, the process of the invention allows for the simple recycling of polyamide-based materials, such as post-consumer items and products.

The use of at least one alkylene carbonate for recycling polyamide-based materials represents a further subject-matter of the invention.

Polyamide-based materials that can be used in the process described above can be, as said, pure polyamides, items, and products made of polyamide. Non-limiting examples of said starting materials are fabrics or fishing nets and materials containing polyamide fibers, possibly along with carbon fibers, polyolefin fibers, natural fibers or other materials, not soluble in alkylene carbonate.

It is readily understood that the process of the invention described above allows obtaining highly pure powdered polyamides, at a cost that is suitable for industrial use.

According to another of its aspects, a subject-matter of the invention is a process for preparing polyamide complexes, that includes adding into the fluid mixture obtained in step (a) or step (b) described above other polymers soluble in alkylene carbonates, such as polyesters and/or polycarbonates, forming polymer alloys, otherwise hardly obtainable by other methods, given the remarkable difference in melting points of these polymers. According to another of its aspects, a subject-matter of the invention is a process for preparing polyamide complexes, that includes adding to the fluid mixture obtained in step (a) or step (b) described above additional components, such as powdered additives otherwise hard to disperse, such as for example nanoparticles, charges, foaming agents, modifiers, stabilizers, dyes, etc.

Through the process of the invention it is also possible to prepare polyamides with lower bending modulus as compared with polyamide-based starting materials. In fact, by carrying out a partial extraction of the alkylene carbonate from the powdered compound of the invention obtained, a powder of the polyamide will be obtained wherein a certain amount of alkylene carbonate is present. This will produce a powdered "plasticized" polyamide that will display a lower bending modulus as compared with the pure polyamide. The skilled in the art is perfectly able to estimate the amount of alkylene carbonate that is wished to be left in the compound, in order to obtain the desired bending modulus.

All the variations of the above described process of the invention and complexes/products deriving from said variations represent additional subject-matters of the invention.

A further subject-matter of the invention is the use of alkylene carbonates as defined above to solubilize polyamides.

The invention will be in detail from the following examples, for illustrative and in no way limiting purpose.

EXPERIMENTAL SECTION

Example 1

350 g of pale blue yarn, of 95% polyamide fiber and 5% carbon fiber, already oven-dried at 110° C. for 2 hours, are dissolved in 1300 g of propylene carbonate at 250° C., operating under nitrogen, with slow shaking. Complete dissolution process of polyamide occurs in 15 minutes. The warm solution is quickly filtered at a temperature between 250° C. and 200° C., under vacuum. On the filter, carbon fibers remain. The filtered solution is allowed to cool down at room temperature for 15 minutes and ground with a hand pestle when its temperature is still 50° C. The fine powder obtained is extracted with methylene chloride, in a Soxhlet apparatus, until the methylene chloride coming out of the Soxhlet is no longer colored. After evaporation of the adsorbed methylene chloride, 330 g of fine powder are thus obtained, which under thermogravimetric analysis show to be made of a single product by 98%. The remaining 2% could be consisting of residual solvent or any inorganic filler.

Example 2

300 g of pale blue yarn, of 95% polyamide fiber and 5% carbon fiber, already oven-dried at 110° C. for 2 hours, are added to 75 g of granules of polyethylene terephthalate and 75 g of polycarbonate granules and this mixture is dissolved in 1700 g of ethylene carbonate at 250° C., operating under nitrogen, with slow shaking. Complete dissolution process of the polymers occurs in 25 minutes. The solution is quickly filtered under vacuum at a temperature between 250° C. and 200° C. On the filter, the carbon fibers remain. The filtered solution is allowed to cool down at room temperature for 15 minutes and ground with a hand pestle when its temperature is still 50° C. The fine powder obtained is extracted with methylene chloride, in a Soxhlet apparatus, until the methylene chloride coming out of the Soxhlet is no longer colored. After evaporation of the adsorbed methylene chloride 400 g of fine powder are thus obtained.

Example 3

500 g of pale blue yarn, of 95% polyamide fiber and 5% carbon fibers, already oven-dried at 110° C. for 2 hours, are dissolved in 1500 g of a mixture, 33% by weight of each component, of ethylene carbonate, propylene carbonate and butylene carbonate, at 250° C., operating under nitrogen, with slow shaking. Complete dissolution process occurs in 15 minutes. The warm solution is quickly filtered under vacuum at a temperature between 250° C. and 200° C. On the filter, the carbon fibers remain. To the filtered solution, at 190° C., 6 g of powdered 5-phenyltetrazole (Ferrocell SPT) are added and dispersed with shaking, and subsequently it is allowed to cool down at room temperature for 15 minutes. The solid solution obtained is ground with a hand pestle when its temperature is still 50° C. The fine powder obtained is extracted with methylene chloride, in a Soxhlet apparatus, until the methylene chloride coming out of the Soxhlet is no longer colored. After removing the adsorbed methylene chloride, 480 g of fine powder are thus obtained, which was extruded at 260° C. and quickly cooled to produce strips of expanded polymer, having a density of 0.6 g/cc.

The invention claimed is:

1. A process for preparing a solid complex comprising at least one cyclic alkylene carbonate and at least one polyamide, wherein the polyamide/alkylene carbonate weight ratio ranges from 0.2 to 1, said method comprising a. mixing at least one polyamide-based material, with at least one alkylene carbonate preheated at a temperature ranging from 160° C. to the boiling point of said at least one alkylene carbonate;
b. optionally filtering the fluid mixture from step (a), at a temperature between 250° C. and 200° C.;
c. optionally adding one or more other components; and
d. cooling down the fluid mixture thus obtained.

2. The process according to claim 1, wherein the solid complex obtained from step (d) is powdered.

3. The process according to claim 2, wherein said powdered complex is extracted with a solvent in which the at least one alkylene carbonate is soluble but the at least one polyamide is not.

4. The process according to claim 1, wherein at the beginning of step (a) polyesters and/or polycarbonates are added to said fluid mixture to obtain polyamide complexes comprising said polymers.

5. The process according to claim 1, wherein at the beginning of step (a) said fluid mixture is reacted with further reagents to obtain polyamide derivatives and/or is added with further components.

6. The process according to claim 1, wherein said at least one cyclic alkylene carbonate is a compound of formula (I)

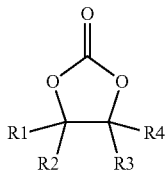

wherein R1, R2, R3 and R4, each independently, represent a hydrogen atom or a straight or branched alkyl chain, having 1 to 4 carbon atoms.

7. The process according to claim 1, wherein said at least one polyamide is selected from Nylons and Aramids and mixtures thereof.

8. The process according to claim 1, wherein the at least one alkylene carbonate and the at least one polyamide constitute together at least 50% of said complex, said percentages being expressed by weight with respect to the total weight of the complex.

9. The process according to claim 6, wherein R1, R2, R3 and R4, each independently, represent a hydrogen or an alkyl chain having 1 to 2 carbon atoms.

10. The process according to claim 1, wherein the polyamide/alkylene carbonate weight ratio ranges from 0.25 to 0.8.

11. The process according to claim 1, wherein the polyamide/alkylene carbonate weight ratio ranges from 0.25 to 0.5.

12. The process according to claim 8, wherein the at least one alkylene carbonate and the at least one polyamide constitute together at least 90% of said complex, said percentages being expressed by weight with respect to the total weight of the complex.

13. The process according to claim 8, wherein the at least one alkylene carbonate and the at least one polyamide constitute together at least 95% of said complex, said percentages being expressed by weight with respect to the total weight of the complex.

14. The process according to claim 8, wherein the at least one alkylene carbonate and the at least one polyamide constitute together up to 100% of said complex said percentages being expressed by weight with respect to the total weight of the complex.

* * * * *